United States Patent [19]

Hall, Jr.

[11] E Re. 28,861

[45] Reissued June 15, 1976

[54] SAFETY MEDICINE BOTTLE CLOSURE

[75] Inventor: Samuel Hall, Jr., Brooklyn, N.Y.

[73] Assignee: Plastic Container Corporation, Brooklyn, N.Y.

[22] Filed: May 23, 1975

[21] Appl. No.: 580,207

Related U.S. Patent Documents

Reissue of:

[64] Patent No.: 3,473,681
Issued: Oct. 21, 1969
Appl. No.: 777,723
Filed: Nov. 21, 1968

[52] U.S. Cl. ..... 215/204; 215/207; 215/215; 215/302

[51] Int. Cl.[2] ..... B65D 55/02; B65D 85/56; A61J 1/00

[58] Field of Search ..... 215/204, 9, 207, 215, 215/296, 302

[56] References Cited

UNITED STATES PATENTS

| | | | |
|---|---|---|---|
| 1,155,082 | 9/1915 | Mostoller | 215/204 |
| 3,393,815 | 7/1968 | Turecek | 215/205 X |
| 3,409,159 | 11/1968 | Velt | 215/204 |

*Primary Examiner*—George T. Hall
*Attorney, Agent, or Firm*—Thomas J. Greer, Jr.

[57] ABSTRACT

A safety container closure for small plastic medicine bottles. A plug is inserted into the top or neck, in a tight friction-fit. The plug carries a key recess. An outer cap fits over the top of the container, and carries a key molded to it. The key is placed into the recess, and the plug engaged for withdrawal.

2 Claims, 5 Drawing Figures

FIG.1
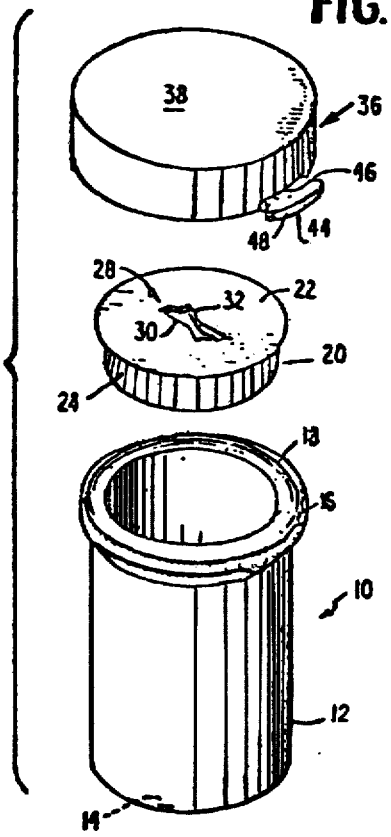
FIG.2
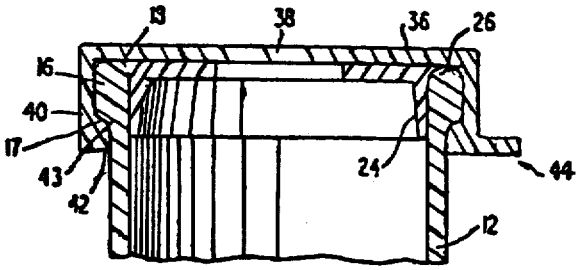
FIG.3
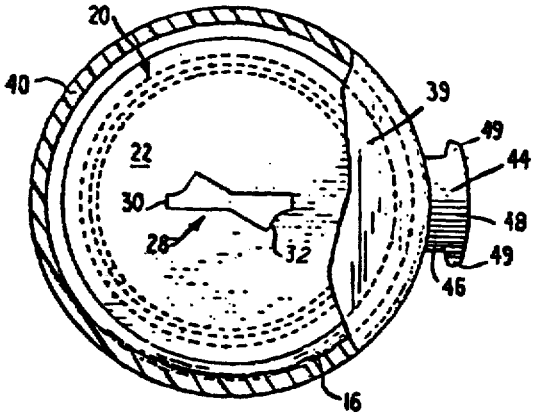
FIG.4
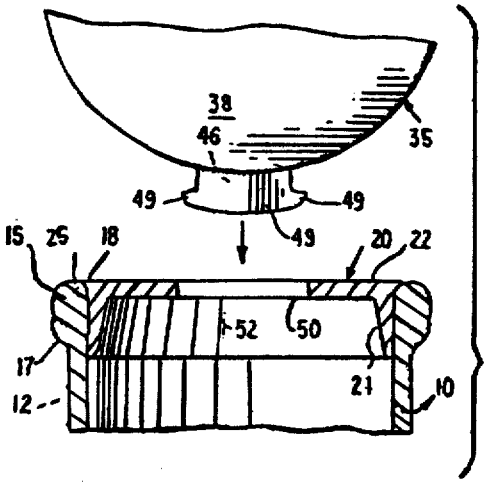
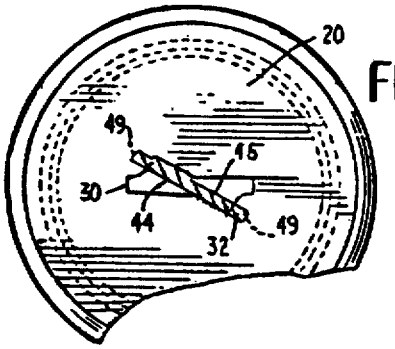
FIG.5

SAFETY MEDICINE BOTTLE CLOSURE

Matter enclosed in heavy brackets [ ] appears in the original patent but forms no part of this reissue specification; matter printed in italics indicates the additions made by reissue.

This invention relates to a safety-plug container closure of the type particularly adapted to contain medicine. While described with reference to ampules and the like, the medicament carrier may be in liquid form in the container. The device further relates to a container closure of the safety type wherein the contents of the container cannot be reached or exposed through a mere unscrewing, lifting or snapping-off action.

The prior art is aware of a variety of arrangements for preventing small children from opening medicine containers. In general, such devices include a closure member and some type of opening procedure or structure too complicated for a small child to comprehend and manipulate. Examples of such prior art devices are to be found in the following U.S. patents, although it will be understood that these arrangements do not represent the entire spectrum of such devices as known in the domestic art—2,793,777: 3,141,756: 3,160,301: 3,164,277: 3,181,718: 3,386,273. While these and other arrangements which are known in the art have been seemingly satisfactory and have presumably fulfilled their intended function they have in general been subject to various objections, such as cost of maufacture, reliability, and the like.

According to the practice of this invention, a novel arrangement of elements is employed for closing a container for medicine and includes a tight fitting plug to seal or close off the end of the container. A second closure or cap member fits over the first and also over a portion of the top periphery of the container. Entrance to the interior of the container is made possible by pulling off the outer cap and then withdrawing the plug. The outer closure is provided with a tab or key, preferably integral therewith and which is inserted into a complementary aperture in the plug. The key is slightly rotated and is then pulled, thereby dislodging the plug. While it has already been known to employ a key slot in a closure plug for a container, and to withdraw the plug from the container by the insertion and pulling of a key element, as shown in U.S. Patent 124,277 to Marsh, the cooperation of elements according to the subject invention is different. Specifically, the key tab is an integral part of the outer closure to thereby preclude loss of the key. Further, it not only performs the function above described, but additionally serves as an abutment against which the thumb of the user may be placed to effect dislodgment of the closure from the container.

In the drawings:

FIG. 1 is an exploded view of a container, a plug and a top closure cap according to this invention.

FIG. 2 is a cross-sectional view of the top portion of a container, with the elements of FIG. 1 assembled.

FIG. 3 is a partially cut-away top view of the assembly of FIG. 2.

FIG. 4 is a view illustrating the plug withdrawal procedure.

FIG. 5 is a view similar to FIG. 3, but showing the opening tongue inserted in a slot in the plug.

Turning now to the drawings, the numeral 10 denotes a container of generally cylindrical form and according to present commercial practice formed of plastic. The container is adapted to contain ampules and the like, which define or carry various medicines such as antihistamines, fungus produced drugs, etc. In general, such containers are rather small, typical dimensions being approximately two or three inches in height and one inch in diameter (six times two cm.). The side walls 12 of the container are of generally uniform thickness and are the same as the thickness of the bottom closure 14. The upper periphery of the container carries an integral and external bead 16 and the topmost portion of the interior of the periphery is chamfered or slanted away in a curved surface as indicated by the numeral 18.

The numeral 20 denotes a plug preferably formed of the same or a similar plastic as that employed in the construction of the container 10. The plug is defined by a generally circular top disc portion 22 from which depends an integral skirt 24. As illustrated, the skirt is tapered although it will be understood that it may be of uniform thickness. The numeral 26 denotes a curved surface extending completely around the periphery between the top surface edge of the disc 22 and the outer surface of skirt 24. The curvature and shape of the surface 26 is complementary to surface 18 shown in FIG. 1. The numeral 28 denotes generally an aperture in the central portion of disc 22 and may be defined by the intersection of two slots. The first slot is designated by the numeral 30 and may be considered as a slot running parallel with one diameter of the disc. The second slot is designated by the numeral 32, and may be considered as intersection of a second diametrical slot which has a lesser length than slot 30 and intersects it at its medial portion at approximately 25 or 30 degrees.

The numeral 36 denotes an outer closure and is defined by a top disc portion 38 from which depends an integral skirt 40 whose lower and inner surface carries an integral bead 42. A key tab 44 is integral with the lower portion of the skirt over a limited angular extent thereof and is defined by a shank or neck portion 46 integral with the flange or skirt 40 and a radially outermost tongue portion 48 having side protrusions 49. The circumferential extent of the outermost portion 48 is only slightly less than the length of the slot 30, so that the entire key tab may be inserted through slot 30.

The elements above described are assembled as shown in FIG. 2 of the drawing and it will be observed that the plug 20 makes a friction fit with the upper interior surface of the container 10. It will further be observed that the top surface of disc 22 is generally co-planar with the uppermost peripheral portion of the bead 16 of the container. A snap fit maintains the outer closure 36 on the container, with the annular bearing portion 43 of bead 42 abutting complementary portions 17 of bead 16. As shown at FIG. 2, the axial extent of contact of the skirt 40 is such that the lower surface of the disc portion 38 abuts the top surface of disc 22 of the plug.

In use, with the container 10 closed or sealed as indicated at FIG. 2, when it is desired to open and obtain access to the contents, the user grasps the container in one hand and with the thumb or other finger of the other hand pushes upwardly against the bottom surface of the key tab 44. This causes the closure to undergo displacement, with the bead 42 sliding over the bead 16. After the closure 36 has been entirely removed, it is manipulated as shown at FIG. 4 so that the key tab is opposite the opening 28. After insertion, as shown at FIG. 5, the closure cap 36 is rotated in a clockwise direction so that the outwardly flaring tips 49 assume a position underneath and slightly beyond the ends of slot 32. In this position, the closure 36 is now pulled and the plug 22 thus removed from the container. For replacement, the plug and top snap cap 38 are separated and the plug is first placed into position and then the cap snapped on, the bead 42 being pushed below the bead 16.

The above description has treated the cylindrical and plastic pill or ampule bottles currently in vogue. However, it will be observed that the invention displays utility as a closure for cross-sections other than circular, as well as with containers having distinct neck portions. While the plastic arts embrace a variety of manufacturing techniques, it has been found that injection molding of the several components of the invention will yield commercially acceptable quality.

I claim:

[1. A safety container closure assembly including,
(a) a container having an opening,
(b) an internal closure positioned within said opening, said closure having a key recess therein,
(c) an external cap positioned over said opening,
(d) said external cap carrying a key at a location not coincident with the location of said key recess,
(e) whereby said cap must be removed to insert the key into the key recess and thereby remove the internal closure.]

[2. The safety container closure assembly of claim 1 including means to limit the extent of insertion of said internal closure into said opening.]

[3. The safety container closure of claim 1 wherein said external cap engages a portion of said container.]

[4. The safety container closure of claims 1, 2 or 3 whereby said key is carried by a peripheral portion of said external closure.]

5. The safety container closure of claim 1 wherein said external closure cap is provided with a peripheral skirt, the lowermost part of said skirt carrying said key, the interior of said skirt carrying an annular bead which snaps over a complementary bead around an outer periphery of the container opening, *whereby the key carried by the external cap functions as a tab against which the thumb is pressed in a generally upward direction to remove the external cap from the container and functions additionally as a key for cooperation with the key recess of the internal closure to thereby permit the internal closure to be removed from its position within the opening of the container.*

[6. The assembly of any of claims 1, 2 or 3 wherein said internal closure includes a central disc portion and wherein said key recess is an aperture therethrough.]

[7. The assembly of any of claims 1, 2, or 3 wherein said internal closure includes an integral, annular skirt whose outer peripheral surfaces frictionally fit the internal closure within said container opening.]

*8. A safety container closure assembly including,*
*(a) a container having an opening,*
*(b) an internal closure in the form of a plug positioned within said opening, said closure having a key recess therein,*
*(c) an outer closure in the form of an external cap positioned over said opening,*
*(d) said external cap having a skirt integral therewith and depending from the top of said cap, the interior of said skirt carrying an annular bead which snaps over a complimentary bead on the outer periphery of container opening,*
*(e) a combination thumb abutment-key integral with and extending substantially horizontally outwardly from said skirt at the lower portion of the skirt, said thumb abutment-key functioning as a tab against which the thumb is pressed in a generally upwardly direction to remove the said external cap from the container and functioning additionally as a key for cooperation with the said key recess of said internal closure to thereby permit said internal closure to be removed from its position within the opening of said container.*

* * * * *